United States Patent

Aaron et al.

[15] 3,697,690

[45] Oct. 10, 1972

[54] DUAL-MODE PHASE-LOCKED LOOP WITH DEAD ZONE PHASE DETECTOR

[72] Inventors: Marvin Robert Aaron, Fair Haven, Monmouth County; Warren Gail Hammett, Middletown, Monmouth County; James Francis Oberst, Howell Twp., Monmouth County, all of N.J.

[73] Assignee: Bell Telephone Laboratories, Incorporated, Murray Hill, N.J.

[22] Filed: June 29, 1971

[21] Appl. No.: 157,961

[52] U.S. Cl. ........................178/69.5 R, 178/69.5 CB

[51] Int. Cl. ..............................................H04n 1/36

[58] Field of Search ...................178/69.5 R, 69.5 CB

[56] References Cited

UNITED STATES PATENTS 2,956,112 10/1960 O'Toole.............178/69.5 CB

*Primary Examiner*—Richard Murray

*Attorney*—R. J. Guenther et al.

[57] ABSTRACT

A timing circuit generates the timing signal used in the regeneration of a pulse code modulation signal which contains a timing burst between each word. This is accomplished by synchronizing a voltage-controlled oscillator (VCO) to the timing burst with a dual-mode phase-locked loop. One loop contains a phase detector with a dead zone, which compares the VCO output with a burst detector signal. This phase detector produces an error signal only until the frequencies of the two signals are the same and their phases are within a prescribed range of each other. The other loop contains a gated phase detector which compares the VCO output to the timing burst and produces a second error signal which is combined with the first to control the VCO.

4 Claims, 7 Drawing Figures

INVENTORS M. R. AARON
W. G. HAMMETT
J. F. OBERST
BY David P. Kelley
ATTORNEY

DUAL-MODE PHASE-LOCKED LOOP WITH DEAD ZONE PHASE DETECTOR

BACKGROUND OF THE INVENTION

This invention relates to regenerative repeaters and, more particularly, to phase-locked loop timing extraction circuits used in pulse code modulation (PCM) regenerative repeaters.

When the digital bits of a PCM signal are transmitted at high rates, the normally sharp pulses become rounded and bell-shaped. This is due to the frequency limitations of the active devices used and the attenuation of the medium through which the signal is transmitted. The tails of these bell-shaped pulses may extend from their own time slots into the adjoining time slots. This will cause a change in the shape of a pulse, depending on whether or not there is a pulse in the time slot immediately before or after it. This effect on the shape of a pulse, due to its neighboring pulses, is known as "intersymbol interference" and it may produce a timing error when pulses are regenerated with a simple level detector. Therefore, a regenerative repeater is used to amplify and retime these pulses. These repeaters sample the incoming pulse train at the proper time and make a decision as to whether the data bit is a "1" or a "0." Since any excess pulse jitter may be enough to cause a pulse displacement on the time scale to the extent that the identities of the incoming "1's" and "0's" are lost and regeneration is impossible, it is necessary to extract the timing information from the pulse train itself.

In the past, the timing information for regeneration has been extracted from the incoming signal with a bandpass filter tuned to the basic pulse repetition rate. A voltage-controlled oscillator (VCO) is then phase locked to the output of this filter. However, when there are large gaps in the pulse train it is very difficult to extract the timing information due to the loss in frequency content at the pulse repetition rate. In addition, in a multilevel PCM system, the apparent phase of the pulse stream can be offset from the correct value due to transitions between unsymmetrical levels. Therefore, a sync pulse or burst is added periodically in the data stream and the VCO is locked to it. However, it is possible for the VCO to lock at a harmonic of the sync rate different from the pulse repetition rate. In the past this problem has been overcome with a frequency detector which produces an error signal proportional to the frequency difference between the VCO and the pulse rate. A dead band or zone must be provided in the frequency detector so that it will not interfere with the final phase lock. This causes the output of the frequency detector to go to zero when the VCO signal is nearly equal to the pulse repetition rate. However, when the sync pulses are spaced far apart this technique may not work since there may be several harmonics of the sync burst frequency in the frequency detector band.

It is therefore an object of this invention to provide a phase-locked loop in a timing extraction circuit which avoids the problem of locking to a harmonic of the sync burst rate which differs from the pulse repetition rate.

It is a further object of the invention to reduce the effects of pattern-related intersymbol interference in a regenerator.

SUMMARY OF THE INVENTION

The present invention is directed to reducing the problem of extracting timing information from a pulse train containing a periodic sync burst through the use of a dual-mode phase-locked loop with a dead zone phase detector. This eliminates the problem of having the VCO lock to a harmonic of the sync burst rate which is different from the pulse repetition rate. It also reduces the effects of pattern-related intersymbol interference. A dead zone phase detector is a phase comparator which has no output when the two input signals have the same frequency and the phase of one is within a prescribed range of the phase of the other.

In an illustrative embodiment of the invention a pulse train consisting of digital words which are 42 bauds long is applied to the repeater. Six of these bauds are used to form a timing burst. The presence of a burst is indicated by a pulse output from a burst detector circuit. This pulse gates the timing burst into a first phase detector where it is compared with the output of a VCO. An error voltage is generated, which is proportional to the phase difference between the two signals. The burst detector pulse is also compared in a second phase detector to a signal which has been generated by applying the VCO output to a divider circuit which passes one of every 42 pulses applied to it. The output of this second phase detector also generates an error signal. The error signals generated in the two phase detectors are combined to provide a correction voltage for the VCO. The error signals are combined either in a summing junction or by using the first error signal to control the phase shift of the divider circuit output pulses which are compared in the other phase detector.

The second phase detector can only achieve a frequency lock and a loose phase lock because intersymbol interference at the edge of the burst causes jitter in the burst detector pulse. However, a dead band is included in the second phase detector to eliminate the jitter error signal in the first phase lock. This occurs because this dead band phase detector will not have an output until the jitter signal produces a phase difference between the burst detector pulse and the divided VCO signal which is greater than its preselected dead zone. The first phase detector can be adjusted to achieve a tight phase lock since only the center zero-crossing of the burst is compared to the VCO and this crossing is isolated from the intersymbol jitter by the other pulses of the burst.

The foregoing and other features of the present invention will be more readily apparent from the following detailed description and drawings.

DETAILED DESCRIPTION

Figure 1:
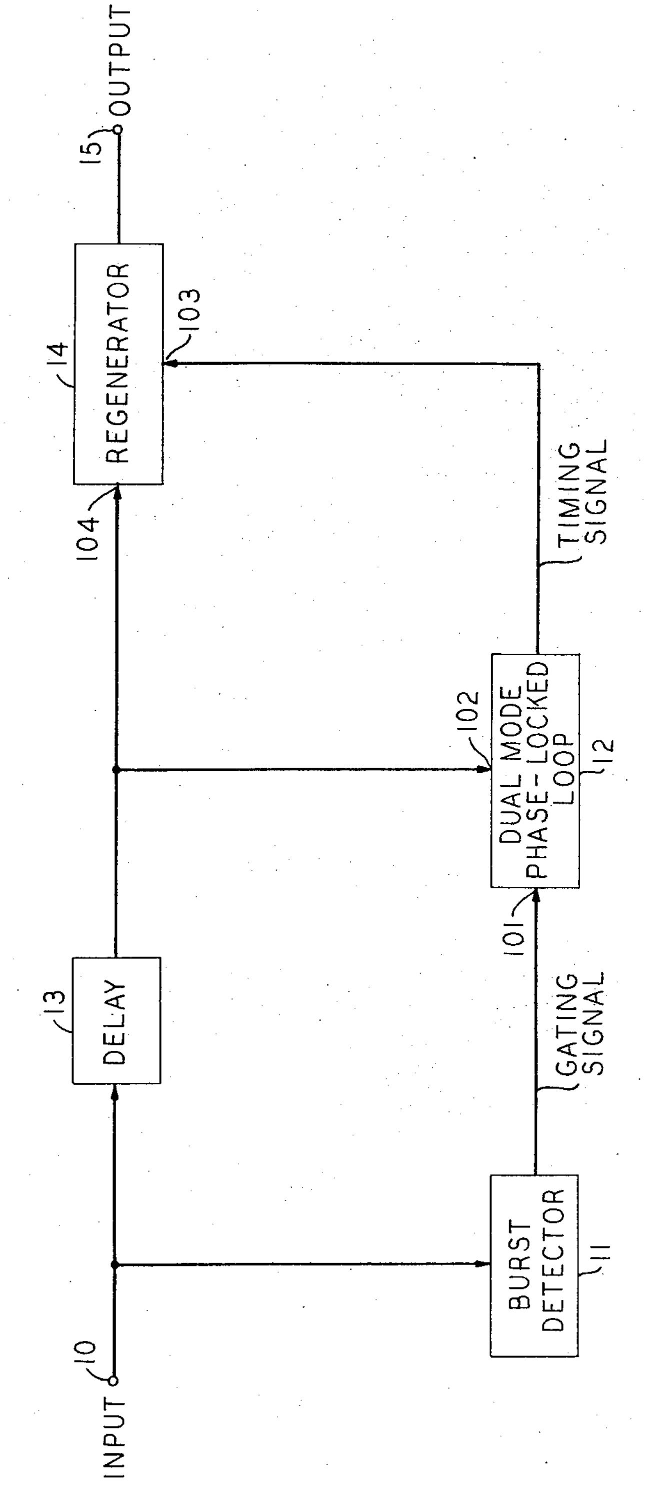
FIG. 1 is a block diagram of a regenerative repeater employing the invention.

The arrangement of FIG. 1 is a PCM repeater, having an input 10 which is connected to the inputs of the burst detector circuit 11 and the delay circuit 13, respectively. The burst detector circuit checks the input signal for the particular code pattern which represents the sync burst. When the code pattern arrives, the burst detector generates a pulse which is applied to the gate input terminal 101 of the dual-mode phase-locked loop 12. The burst detector is designed with conventional sequential logic techniques well known in the art. The output signal of delay circuit 13 is the same as the input signal except that it has been delayed an amount of time sufficient to give the burst detector an opportunity to check for the correct code. The delay circuit 13 can be any of the digital delay circuits well known in the art. By way of example, the delay circuit can be a length of coaxial cable or a shift register. The output of the delay circuit is applied to timing burst input terminal 102 of the dual-mode phase-locked loop 12 and signal input 104 of regenerator 14. The input to terminal 101 of the dual-mode phase-locked loop acts to gate the signal at terminal 102 into the loop. The output of the loop, which is used as the timing signal for the regenerator, is applied to terminal 103. The output of the regenerator is applied to output terminal 15 of the circuit. The burst signals are detected and then gated into the phase-locked loop where they are used to synchronize the local oscillator contained in the phase-locked loop. This local oscillator supplies the timing to the regenerator so that it may sample and reshape the input pulses for further transmission. The regenerator can be any of a number of circuits well known in the art. By way of example, the regenerator disclosed in U.S. Pat No. 2,992,341 of F. T. Andrews, Jr., et al., which issued July 11, 1961, may be advantageously employed.

Figure 2:
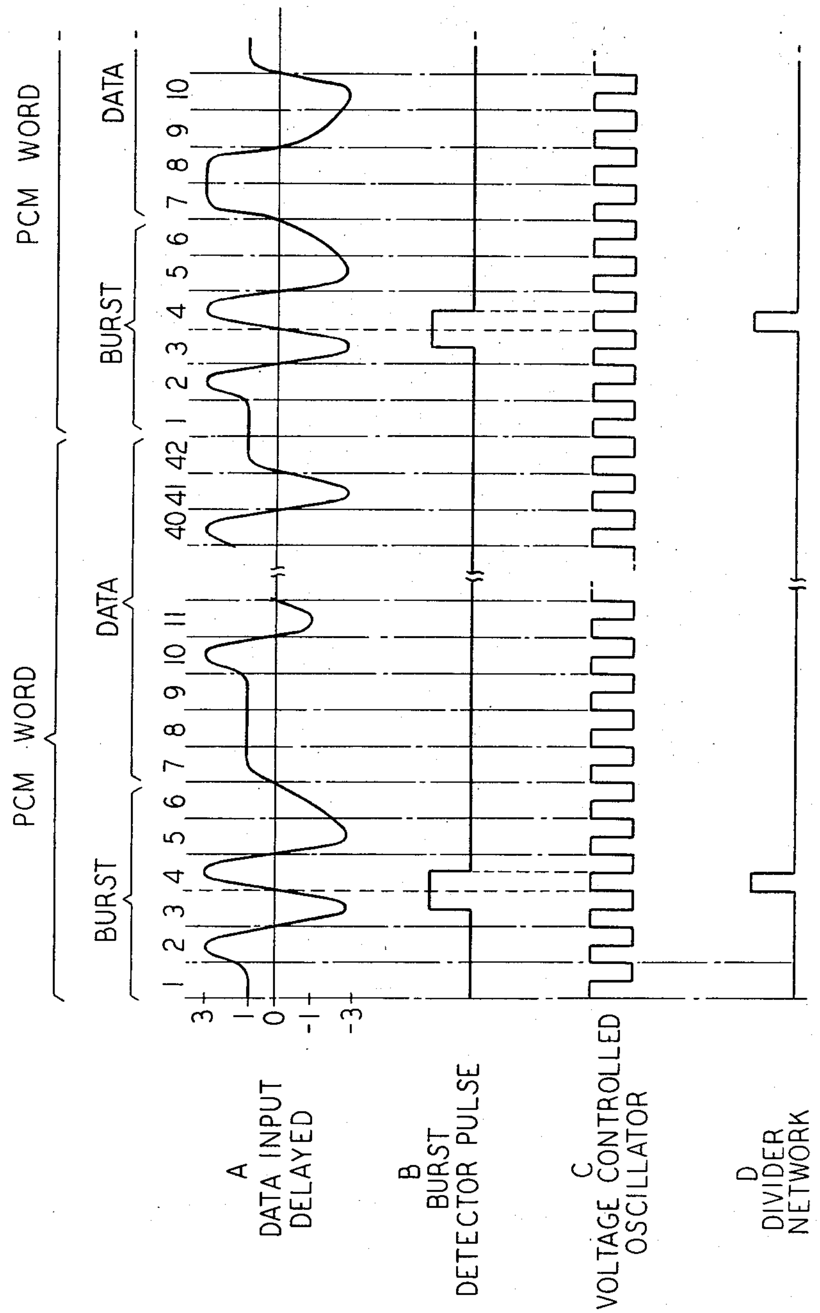
FIG. 2 is a timing diagram for an illustrative embodiment of the invention.

A typical four-level PCM input signal applied to the repeater is shown in curve A of FIG. 2. Curve A shows a series of PCM words which are 42 bauds in length. The first 6 bauds of each word are used as a sync burst, dedicated to timing extraction. In this case, the sync burst is arranged to have the format: +1, +3, −3, +3, −3, −1. The burst detector circuit of FIG. 1 is arranged to look for the occurrence of this pattern and the generate the burst detector pulse shown in curve B of FIG. 2 on its occurrence. The pulses of the input signal are rounded in shape because of the loss of high frequency content. This causes the tails of the pulses to extend from their time slot into the neighboring time slots, producing intersymbol interference.

The critical point for synchronization occurs at the zero-crossing between the third and fourth pulses of the burst. Since the burst always has the same shape, this zero-crossing is protected from intersymbol interference. However, zero-crossings at the end of the burst, such as that which occurs between pulses six and seven, depend on the amplitude and polarity of the data pulses. Therefore, a pattern-related "jitter" due to intersymbol interference occurs in the burst detector pulse.

The function of the repeater is to amplify and retime the input signal by sampling it during the middle of the time slot. To accomplish this, a local oscillator contained in the phase-locked loop is brought into sync with the center zero-crossing of the burst. Curve C of FIG. 2 shows a typical output of such an oscillator. The output of this oscillator is arranged so that it has the same frequency as the input signal. Therefore, there are 42 pulses between each center zero-crossing of the bursts. However, it is possible that during start-up the local oscillator may synchronize to a harmonic of the burst signal such that there are either 41 or 43 pulses between the center zero-crossings of the bursts. This would represent only a 2.4 percent error in the local oscillator frequency; however, it would lead to sampling errors in the repeater. This problem could also occur due to temperature drifts in the components of the circuit. This would be particularly troublesome in a system containing a long series of repeaters, such as a crosscountry telephone system. In the past, proposed solutions for this problem have utilized a frequency detector in the phase-locked loop. This frequency detector operates until the input signal and the local oscillator have nearly the same frequency and then its output goes to zero. These frequency detectors are generally implemented by charging a capacitor with a constant width pulse applied at the input frequency rate. The voltage developed across the capacitor is then proportional to the input frequency. However, in the present situation, a frequency detector would be ineffective because capacitors generally have tolerances which are in excess of the 2.4 percent needed. Also, their capacitance tends to vary with temperature.

An additional difficulty arises when a timing burst must be used. Without a timing burst, a conventional loop normally makes a phase comparison with each input pulse (at the band rate). Therefore, this sampling rate is usually much greater than the closed loop bandwidth, causing a self-filtering which completely suppresses the sampling characteristics. However, in the present situation where a burst must be used, the sampling rate is 42 times less than the local oscillator rate. This will introduce peaking in the transfer function which causes jitter gain at some frequencies. To eliminate this effect, the loop bandwidth must be restricted to less than the sampling rate with a filter. However, limiting the bandwidth of the loop will also reduce its pull-in range. The present invention, as embodied in the circuit of FIG. 3, provides a method for overcoming these problems.

Figure 3:
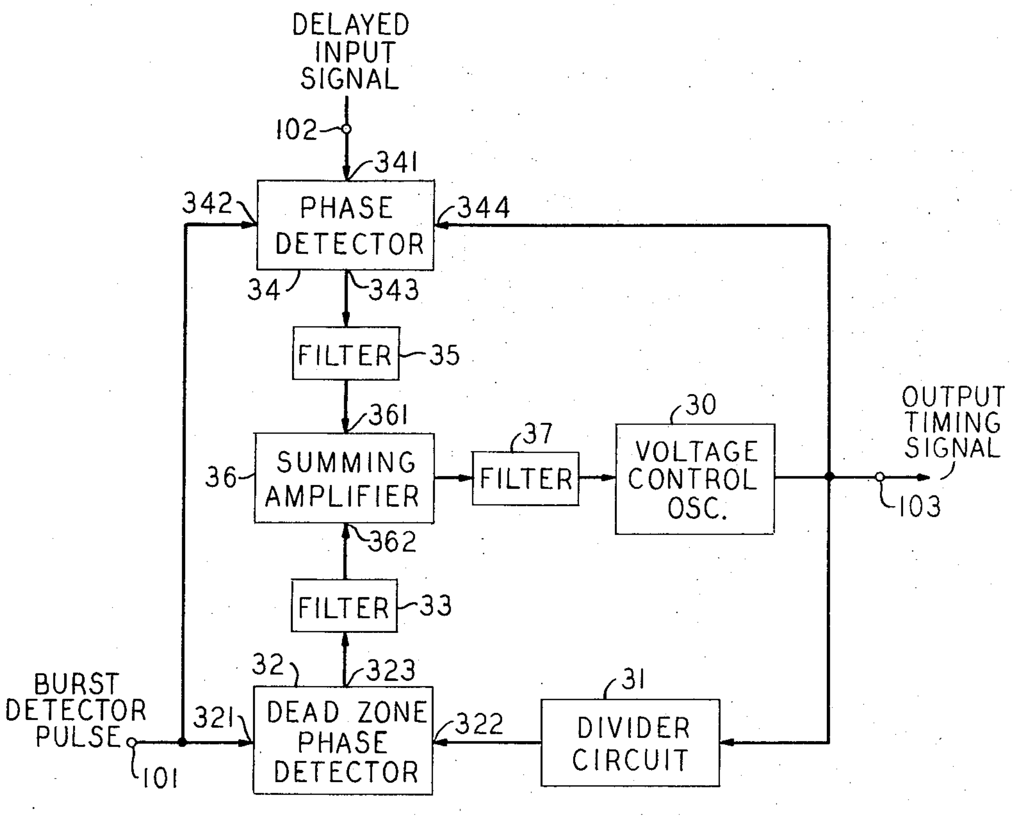
FIG. 3 is a block diagram of an illustrative embodiment of the invention using a summing junction.

FIG. 3 is an illustrative embodiment of the invention. It represents the dual mode phase-locked loop 12 of FIG. 1. The burst detector pulse from burst detector 11 of FIG. 1 is applied to input terminal 101. The delayed input signal from the output of delay circuit 13 of FIG. 1 is applied to input terminal 102. Terminal 101 is connected to input terminals 321 and 342 of phase detectors 32 and 34, respectively. The output of voltage-controlled oscillator (VCO) 30 is applied to input terminal 344 of phase detector 34. The VCO can be any of the prior art digital voltage-controlled oscillators. The input terminal 102 of the circuit is connected to input terminal 341 of phase detector 34. Phase detector 34 compares the phase of the delayed input signal with the VCO output whenever gate terminal 342 is activated by the burst detector pulse. This occurs at the time of the center zero-crossing transition of the burst signal, as shown in curves A, B and C of FIG. 2. An output voltage equivalent to the phase difference is applied through filter 35 to input 361 of summing amplifier 36. Phase detector 34 can be any of the many circuits described in the prior art with additional circuitry to disable it until a burst detector pulse is present.

The output of VCO 30 is also applied to divider circuit 31. Divider circuit 31 produces one output pulse for every 42 pulses applied to it. This divider circuit can be any of the prior art counter circuits with a decoder connected to its outputs which produces a signal when a particular count is reached. The output of the divider circuit is represented by curve D of FIG. 2. This output is applied to input 322 of phase detector 32. Phase detector 32 compares the output of the divider circuit with the burst detector pulse and produces a signal proportional to the phase difference. This signal is passed through filter 33 to input 362 of summing amplifier 36. Summing amplifier 36 combines the two signals and produces an output signal which is passed through filter 37 to the control terminal of VCO 30. The output of VCO 30 is connected to the circuit output terminal 103.

Phase detector 32, which is a type of sample and hold circuit, is similar to phase detector 34 except that it has a dead zone or band. It will produce an output until the frequency of the phase detector pulses and the pulses from the divider circuit are equal and their phases are within a prescribed limit of each other. At this point the output of phase detector 32 will go to zero and the correction signal for VCO 30 will depend entirely upon the phase comparison between the center zero-crossing of the sync burst and the VCO output. This phase detector can be either of the types disclosed in copending application, Ser. No. 157,960, J. F. Oberst, which was filed on June 29, 1971. The use of this type of detector overcomes the problem of assuring that the VCO is not locked to one of its nearby harmonics. The use of a phase detector and the burst detector pulse allows for a simpler and more accurate method of achieving frequency lock than that provided by a frequency detector. Also, the need for expensive high precision capacitors is eliminated.

The dead zone is required in phase detector 32 because the burst detector pulse is subject to jitter. The major contributors to this jitter are intersymbol interference from the information bearing pulses immediately preceding the burst, crosstalk within the repeater, and thermal noise which is accentuated by the burst detector. When the final lock is achieved, phase detector 32 is in the dead zone and this jitter does not contribute to the VCO correction signal. Also, this particular arrangement allows the independent adjustment of filters 33 and 35. Filter 33 is adjusted to have a high overall gain and wide bandwidth to insure a good pull-in range for the phase-locked loop. However, filter 35 is adjusted to have a narrow bandwidth and high-gain at dc only in order to assure a tight lock once phase detector 32 has cut out.

There are several options available in this timing system. The phase detector 34 gating signal at terminal 342 can be derived from the output of the divider circuit 31, thereby eliminating any false gating due to jitter in the burst detector pulse. Also, coincidence signals from phase detector 32 could inhibit the phase detector 34 gating signal, thus reducing interference during pull-in.

Figure 4:
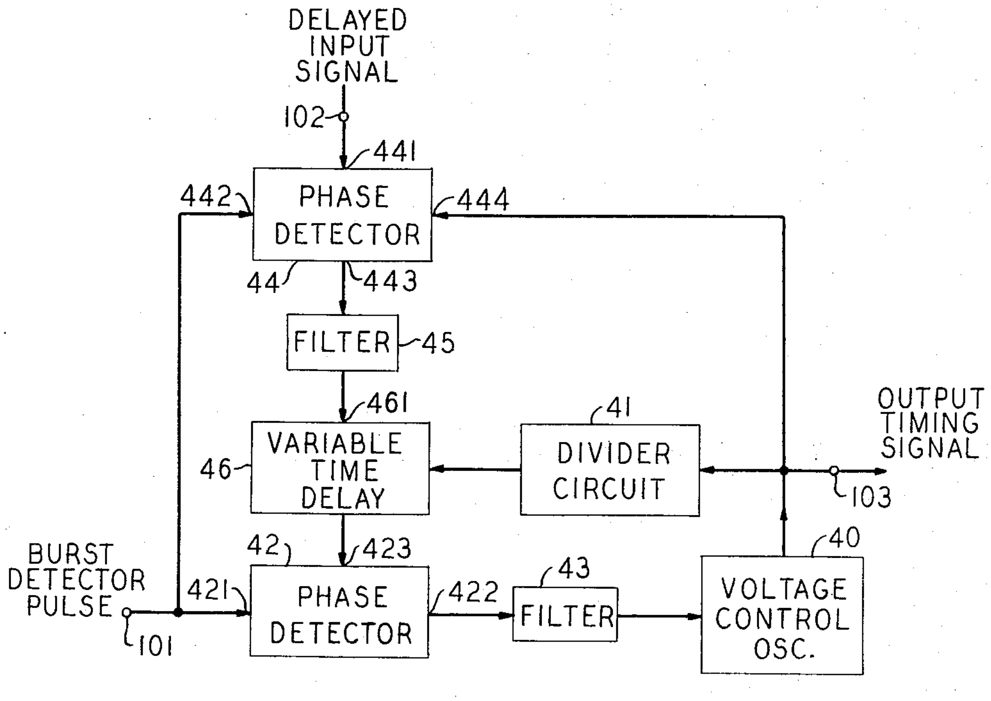
FIG. 4 is a block diagram of an illustrative embodiment of the invention using a variable time delay.

FIG. 4 demonstrates an alternative method of combining the error signals. The burst detector pulse is applied to terminal 101 of this alternative arrangement. The delayed input signal is applied to terminal 102 of the circuit. Terminal 101 is connected to terminals 421 and 442 of phase detectors 42 and 44, respectively. The output of VCO 40 is connected to input terminal 444 of phase detector 44. Terminal 102 is connected to input terminal 441 of phase detector 44. Phase detector 44 compares the center zero-crossing of the sync burst signal to the output of VCO 40 whenever gate terminal 442 is activated. An output voltage proportional to the phase difference appears at terminal 443 of phase detector 44 and is applied through filter 45 to control terminal 461 of variable time delay circuit 46. The output of VCO 40 is also applied to divider circuit 41 which passes one of every 42 pulses applied to it. The output of divider circuit 41 is passed through time delay circuit 46 to input 423 of phase detector 42. Phase detector 42 compares the output of time delay circuit 46 with the burst detector pulse and produces an output signal at terminal 422 which is proportional to the phase difference. The output signal at terminal 422 is applied through filter 43 to the control terminal of the VCO. The output of VCO 40 is also connected to terminal 402, the output of the circuit.

The error signal produced by phase detector 44 controls the amount of time delay for the pulses from divider circuit 41. Since these pulses are used in the comparison with the burst detector pulses in phase detector 42, the two error signals are effectively combined to control the output of VCO 40. In this arrangement phase detector 42 cannot be a dead-band phase detector. Therefore, filters 43 and 45 cannot be independently adjusted to maximize both pull-in range and phase lock accuracy. Filter 43 is adjusted so that a narrow bandwidth and high-gain are achieved. This is done to eliminate the sampling characteristic from the output. Since the output of filter 45 must pass through filter 43 to get to the VCO, a wide bandwidth for filter 45 will not improve the pull-in range. In situations where the loops sampling rate is close to the VCO rate the bandwidth of filter 43 can be increased to give an improved pull-in range.

Figure 5:
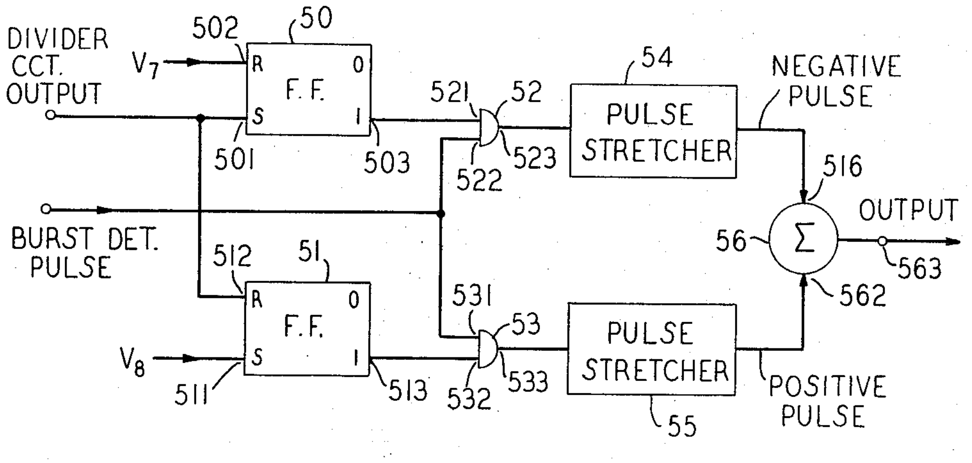
FIG. 5 is a schematic of a dead zone phase detector.
Figure 6A:
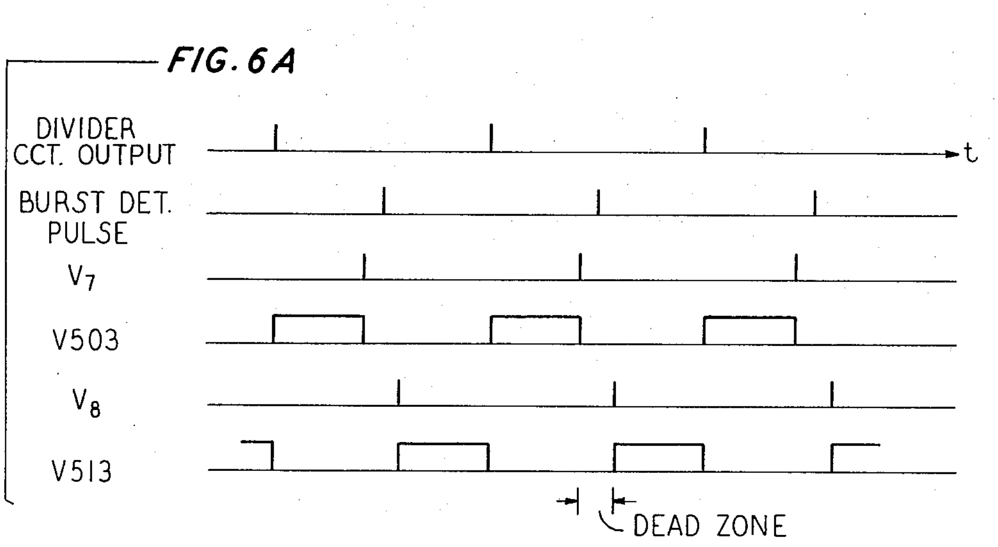
FIG. 6A is a timing diagram for the circuit of FIG. 5.
Figure 6B:
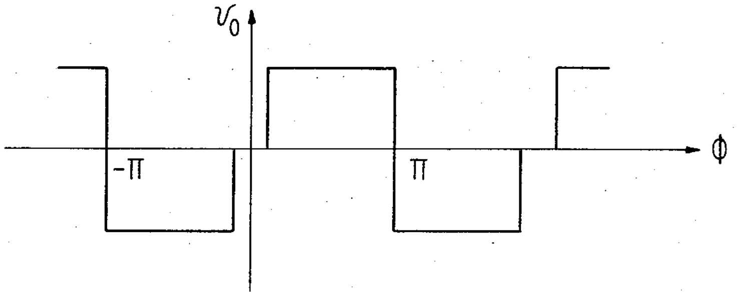
FIG. 6B is a transfer function for the circuit of FIG. 5.

FIG. 5 is a schematic of the dead-band phase detector disclosed in the previously identified application of J. F. Oberst. This circuit is used in the circuit of FIG. 3, even though its output is not proportional to the phase difference. The burst detector pulse is applied to terminals 522 and 531 of two input AND gates 52 and 53, respectively. The divider circuit output is applied to terminals 501 and 512 of flip-flops 50 and 51, respectively. Signal $V_7$, applied to terminal 502 of flip-flop 50, and signal $V_8$, applied to terminal 511 of flip-flop 51, are derived from auxiliary outputs of the divider circuit. Output terminal 503 of flip-flop 50 is connected to input terminal 521 of AND gate 52, and output terminal 513 of flip-flop 51 is connected to input terminal 532 of AND gate 53. Also, the output signal at terminal 523 of AND gate 52 is applied through pulse stretcher 54 to input 561 of summing junction 56. In addition, output 533 of AND gate 53 is applied through pulse stretcher 55 to input 562 of summing junction 56. The summing junction adds the pulse stretcher outputs together and produces the phase detector output at terminal 563. The timing diagram for this circuit and its transfer function are shown in FIGS. 6A and 6B, respectively.

Flip-flops 50 and 51 generate two pulses, $V_{503}$ and $V_{513}$, which do not overlap. However, they cover most of the period of the divider output signal. When the burst detector pulse occurs during the $V_{503}$ pulse, the circuit has a positive output pulse, whose width depends on the pulse stretcher. When it occurs during the $V_{513}$ pulse, a negative pulse is produced. Only when the burst detector pulse occurs at the same rate as the outputs from the divider network and its phase puts it in the region where both flip-flop pulses are zero, is there no output from the circuit. A conventional dead-band detector would produce a correction voltage proportional to the phase difference. However, as can be seen from FIG. 6B, this circuit applies maximum correction voltage to the VCO, even for small errors. This will help to decrease the pull-in time for the phase-locked loop.

Although a specific embodiment of this invention has been shown and described, it will be understood that various modifications may be made without departing from the spirit of this invention.

We claim:

1. A timing extraction circuit for synchronizing an oscillator having a pulsed output to an input signal, said input signal being characterized by timing frequency burst which are spaced periodically in said input signal, comprising:

a burst detection means for generating a burst detection signal at its output on the occurrence of a frequency burst in the input signal;

a voltage-controlled oscillator having a control terminal and an output terminal;

a frequency dividing means connected to the output of said voltage-controlled oscillator, which passes one of every $n$ pulses from said voltage-controlled oscillator;

a first phase detecting means having a first input connected to the output of said frequency dividing means and a second input connected to the output of said burst detection means, which compares the output of said frequency dividing means with the burst detection signal and produces a first error signal at its output which is related to the comparison;

a second phase detecting means having a first input connected to the output of said voltage-controlled oscillator, a second input connected to receive the input signal, and a third input connected to the output of said burst detection means, which compares the output of said voltage-controlled oscillator to the frequency burst in the input signal, whenever the burst detection signal is present, and produces a second error signal at its output which is related in the comparison; and a means for combining the first and second error signals and applying them to the control terminal of said voltage-controlled oscillator.

2. A circuit as claimed in claim 1 wherein said first phase detecting means comprises a dead-zone phase detector which compares the output of said frequency dividing means with the burst detection signal and produces the first error signal which is present only until the frequencies of the two signals are substantially the same and their relative phases are within a prescribed limit.

3. A circuit as claimed in claim 1 wherein said means for combining the first and second error signals comprises:

a first filter connected to the output of said first phase detecting means;

a second filter connected to the output of said second phase detecting means;

a summing amplifier which sums the output signals of said first filter and said second filter; and a third filter connected between the output of said summing amplifier and the control terminal of said voltage-controlled oscillator.

4. A timing extraction circuit for synchronizing an oscillator having a pulsed output to an input signal, said input signal being characterized by timing frequency bursts which are spaced periodically in said input signal, comprising:

a burst detection means for generating a burst detection signal at its output of the occurrence of a frequency burst in the output signal;

a voltage-controlled oscillator having a control terminal and an output terminal;

a frequency dividing means connected to the output of said voltage-controlled oscillator, which passes one of every $n$ pulses from said voltage-controlled oscillator;

a variable time delay means having a control terminal, an output terminal, and input terminal which is connected to the output of said frequency dividing means, said variable time delay means varying the phase of the pulses from said frequency dividing means in response to a signal on its control terminal;

a first phase detecting means having a first input connected to the output of said variable time delay means and a second input connected to the output of said burst detection means, which compares the output of said variable time delay means with the burst detection signal and produces a first error signal at its output which is related to the comparison;

a first filter means connected between the output of said first phase detecting means and the control terminal of said voltage-controlled oscillator;

a second phase detecting means having a first input connected to the output of said voltage-controlled oscillator, a second input connected to said input signal, and a third input connected to the output of said burst detection means, which compares the output of said voltage-controlled oscillator to the frequency burst in the input signal, whenever the burst detection signal is present, and produces a second error signal at its output which is related to the comparison; and a second filtering means connected between the output of said second phase detecting means and the control terminal of said variable time delay means.

* * * * *